United States Patent

[11] 3,631,479

[72] Inventor Edward J. Fitzell
Birkenfeld, Oreg. 97016

[21] Appl. No. 867,010
[22] Filed Oct. 16, 1969
[45] Patented Dec. 28, 1971

[54] SCANNING-CIRCUIT RESOLVING SWITCH
1 Claim, 15 Drawing Figs.

[52] U.S. Cl. .................................................. 340/347 DD, 340/146.3 F, 340/357, 340/347 P
[51] Int. Cl. .................................................. H03h 13/24
[50] Field of Search .......................................... 340/347, 357

[56] References Cited
UNITED STATES PATENTS
3,371,336 2/1968 Bennett ........................ 340/347
3,376,569 4/1968 Watkins ........................ 340/347

*Primary Examiner*—Maynard R. Wilbur
*Assistant Examiner*—Robert F. Gnuse

ABSTRACT: This is an electromagnet, photoelectric switch with a continuously rotating shaft as driven by a scanning-wheel shaft. Its use is for a blind reader or any correctly timed binary code groups. There are several hundred binary code light holes possible on a relatively small code disk as for each disk to represent a cell of the scanning system array of cells. The disks automatically reset on null operations. On a valid code, a light beam gets through and a fast-acting relay system holds them until the output section of the switch delivers the output mechanically.

INVENTOR.
Robert A. Bloom
BY
Sidney A. Ochs
ATTORNEY.

SCANNING-CIRCUIT RESOLVING SWITCH

The invention primarily relates to small office-type computer-type machines using photoelectric tube optical character recognition systems. While this invention can handle any similar sequence of binary code, its purpose is here described for use in a printed character reading machine for the blind. It is a photoelectric switch with a mechanical type of output. It is unique for its simplicity, capacity and low cost. It is built in two main sections with shafts coupled together. The second section is also coupled to the scanning-wheel shaft so as to keep all of these units synchronized with each other. The first section of the switch uses circuits from several parallel scanning circuits to increase the switch's capacity. It operates during one-half of its shaft's revolution. The scanning is also limited in this way. During this dwell time, the second section of the switch operates. Its circuit is fed by three photoelectric tube circuits, in parallel, from the first section of the switch. Actually, during its dwell period the first section of the switch synchronizes the light beam for its phototubes thus passing on to the second section of the switch a synchronized electrical impulse. In theory the second section of the switch would be able to operate in one-third of its shaft's revolution. However, if it gets an electrical impulse it "freezes" the scanning and first section of the switch until it completes its operation. Its operation is by the movement of one or more of its output shafts. The scanning wheel and switch shafts continue to rotate at all times.

Some exaggerations and omissions were used in the main first two drawings, repeated in later drawings, in order to make them easier to understand and be more clear. The reference numbers and markings are on the drawings.

FIG. 1 is a vertical sectional view of the first unit of the switch. It is the input binary code unit of the switch.

FIG. 2 is a vertical sectional view of the second unit of the switch. The phototube circuit of the first unit operates it. It converts this information into a mechanical output by moving its selected output shaft or shafts.

FIG. 4 is a cross-sectional view taken on line 4—4 of FIG. 2.

FIG. 5 is a cross-sectional view taken on line 5—5 of FIG. 6.

FIG. 6 is a vertical sectional view of area marked 6 of FIG. 1 and taken along line 6—6 of FIG. 5.

Figures 1, 2:
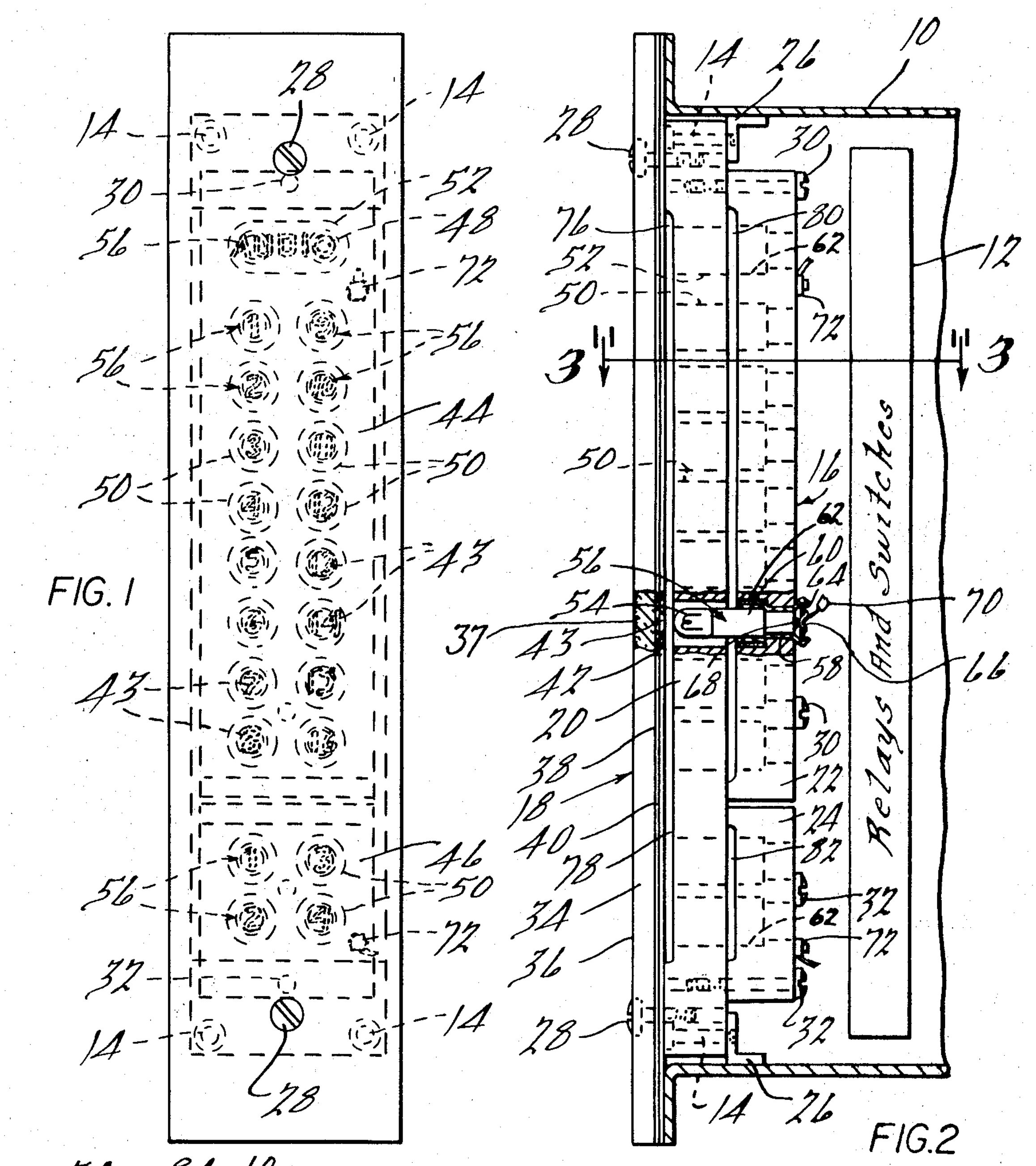
Figure 3:
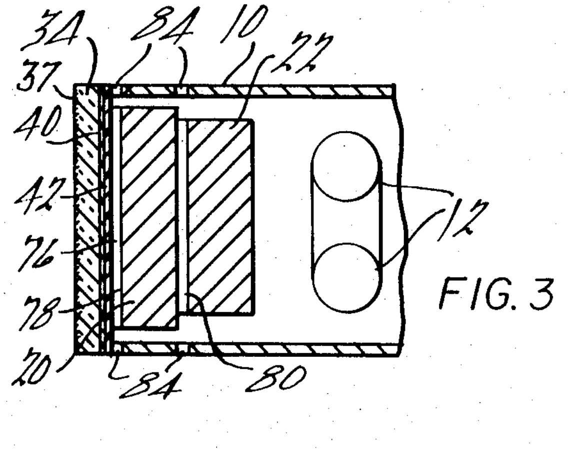
FIG. 3 is a vertical sectional view as shown in FIG. 2 here drawn as a vertical view by itself.

FIG. 7 is a cross-sectional view taken along line 7—7 of FIG. 1. It shows the code disk end plate with cutout light beam code (zero) holes. Hidden is a similar plate, a spacer plate, behind it. Behind these is shown the 12 code disks and their ears. The view takes in the hollow shaft with one of its electromagnets but not the switch case which would surround it.

FIG. 8 is a face view of the first code disk shown in FIG. 7. Except for its ear placement, it is identical to all of the code disks of the switch since both the zero and the 1 holes are marked side by side. Which of these holes or both would be cut out would depend on the code required for the disk.

FIG. 9 is a side view to show a set of code disk ears to show their bend to be in alignment for the electromagnet.

FIG. 10 is a face view of a spacer disk. These disks hold the internally placed "hold" and "return-to-start" electromagnets of the code disk spool.

FIG. 11 is a top view of the case section indicated by 12′—12′ of FIG. 1 and 12—12 of FIG. 2 for light bulb replacement.

FIG. 12 is a face view of the end spacer which forms three light zone holes when with the case end plate it is attached to.

FIG. 13 shows the end and side views of the "hold" electromagnet; the "key"; and "key" electromagnet of the code disk spool.

FIG. 14 is a face view of the shutter to synchronize the light beam through the code disks.

FIG. 15 shows the jumper wiring between segments of the commutator shown in FIG. 2 to assign a brush to its same one-third output shaft area.

Referring to FIG. 1 the shaft 40 enlarges inside the first bearing 36A to a cylinder or hollow shaft 18 in the case 16. It holds one electromagnet 20 for each group of code disks 24. While a hollow shaft is the preferential method of construction, a fork of two arms for the first section of the switch FIG. 1 and three arms for the second section of the switch FIG. 2 could be used. FIGS. 1 and 2 could represent both types of construction. The binary code input representing one circuit is fed to a brush 29, passes to a slipring 39, and wire 30 to an electromagnet 20 on the hollow shaft 18 and to ground. When energized the electromagnets 20 move the code disk ears 22 of magnetic attractive material on passing them as the hollow shaft 18 revolves around them. Every other set of the groups of code disks 24 has its ears on the opposite half-circle of magnet travel in order to balance these electromagnets 20 on the hollow shaft 18. Otherwise, only for this difference, all the code disk groups are identical.

Referring to FIG. 2 (the switch's second section) the switch's shaft 42 continues through this switch to act as a connecting link by a coupling 41 to the shaft 40 of the first section of the switch. The opposite end of the switch's shaft 42 connects to the input binary code shaft such as a scanning-wheel shaft the switch would serve. The shaft 42, after passing through the bearing 36Y and is on the inside of the case 17, holds and drives a hollow shaft 19 (or equivalent three-arm fork 19). The series position, 120° apart, of the three electromagnets 21 held by the hollow shaft 19 are wired 79 separately, each to a commutator top segment of the three commutators 55. Each commutator 55 has three segments. So that each brush 54 will represent each INPUT circuit in a separate permanent mechanical output area, the wiring of the remaining segments of the commutator 55 are by jumper wires as shown in FIG. 15. The way these segments are connected from commutator 55 to commutator 55 is in the order or 1 to 2 to 3, 2 to 3 to 1, and 3 to 1 to 2.

The second-section phototube 63, light source 52, shutters 58, 59–81, and relay 57 is an appendage to this second section of the switch as this unit could be a separate unit anywhere driven by the switch shaft. The hollow shaft 19 acts as a shutter by an aperture 59 which passes an aperture 51 in the switch case 17 for the phototube 63 in socket 64 in the case 17. The aperture 59 in the hollow shaft 19 can be considered as the light bulb 52 replacement hole 81 with an adjustment for size. The small imaginary reflection of the case 17 aperture 51′ on the light bulb 52 is on a level plane towards you as the case and hollow shaft 19 have been cut away in this view. The light bulb wires 56 lead out through a hole in the case end plate 48. The relay 57 operates the return-to-start electromagnet 75 circuit. When a code light beam gets through to the first section of the switch to its phototubes 43, they cause the relay 57 to operate closing the shutter 58 on aperture 51. This prevents the phototube 63 to operate so the return-to-start magnet 75 does not move the code disks 24 to the start position. Since, also, at the same time parallel circuits as that to the relay 57 operate similar relays to stop the scanning input impulse and hold the movement of the printed material being scanned, an identical repeated input is sent to the second section of the switch. When the second section of the switch can make its operation cycle it then releases the relay. The other circuits are released and a new cycle of switch operation starts.

The case 17 has two bearings 36Y, 36Z for the shaft 42 which rotates the hollow shaft 19 and its three, in a series position, electromagnets 21. These electromagnets 21 when energized and on passing the magnetic attractive material of the ears 23 will move the ears in a direction of the shaft's rotation. The ears are attached to the output shafts 50 which limit the ear's 23 travel to about a space which is about equal to the travel of the ears 22 of the code disks 24 of the first section of the switch. These output shafts 50 are pivoted by the holes in the spool 49 they pass through. The spool 49, in turn, is held by the end plate 48. The output shafts 50 would be returned to their start position by the linkage for required for the machine this switch would serve.

Referring to the first section of the switch and the phototube compartment for the three phototubes 43, the case 16 which includes the case's end excludes the unwanted light. The compartment divider 61, end plate 27 three holes 60 along with the three holes provided by the spacer plate 26 and shutter 25' keep the unwanted light from the separate phototubes 43. The phototubes 43 can then operate from the code light beam independently of each other. A circuit from any of the phototubes 43 operate the relay 57 with the first of a series of identical repeated impulses. The shutter 25' attached to the hollow shaft 18 is identical to the shutter 25 at the other end of the code disk 24 assembly. Both shutters 25, 25' slots are aligned with each other. The bearings 36B, 36C that act to support the hollow shaft 19 and code disk pin 44 are also held by the central holes 73 of these shutters 25, 25'. Usually the code (the code disks 24 code holes 46, 47) for one character would allow but one light beam AREA of several possible light beam paths to get to the three light ZONES of the phototubes 43 and the output would be from but one phototube for one of the full switch's FIGS. 1, 2 operation. These electrical output impulses are synchronized by the shutters 25, 25' in accordance to the shaft's 40, 42 position and so passed along to the second section of the switch for final recognition. The binary electrical code input received is thus resolved by the movement of the output shafts 50 to a mechanical type of output.

The end plate 27 of the case 16 acts as a three-hole 60 light beam guide for the phototube 43 along with its spacer plate 26 hole 76. The end plate 27 supports the code disks 24 and light bulb holder and reflector 31 with its light bulbs 32 by the code disk pin 44. The pin nuts 37, 37' hold it to the end plate and the light bulb holder and reflector 31. At its support point the pin 44 being hollow receives the light bulbs 32 power wires 33, hold electromagnet wires 34 and the key electromagnet wires 35. These magnet wires leave the pin through drilled holes inside the bearing 36C. FIG. 7 shows a view referred to in FIG. 1 on line 7—7 is a cross section view looking at the face of a code end disk 38 on pin 44. It 38 is stationary being part of the code disk spool. The zero holes 45 are cut out as these are the light beam holes. The central pin 44 hole 78 is fastened to the pin 44 by a press fit. The end disk 38 has two boltholes 65 for the spool assembly and two holes 77 for wires for joining electromagnets 74, 75 when it is used within the spool. Where the key 70, key (return-to-start) electromagnet 75 and hold electromagnet 74 were only long enough for one or several code disk 24 groups of the spool of more groups, an end disk would be used. This would lessen the force on a single stalled code disk 24.

Shown in FIG. 10 but hidden behind the end disk 38 in fig. 7 is the spacer disk 28. It 28 has the same cutout zero holes 45' and bolts 62 as the end disk 38. It 28 has a large upper hole 68 to hold and make the hold magnet 74 stationary and a large lower hole 71 for the same purpose for the key magnet 75 including clearance for the key 70 where it extends beyond the spacer disk 28. FIG. 8 shows a face view of a code disk 24 in the same position as shown in FIG. 7. The code holes are left not cutout but marked for the zero 46 and one 47 side by side in this drawing. Either or both would be cut out to represent the code required of the disk 24. Except for the ear 22 positions and bends FIG. 9 for the groups of 12 (used to illustrate this invention) all the disks of the code disks 24 are identical. The two bolt clearance holes 66 of the code disk 24 are in alignment with boltholes 65 of the end disk 88 and the boltholes 62 of the spacer disk 28 but are large enough to allow full movement of the code disk 24 when two bolts and their sleeves make up the code disk spool assembly. The large upper hole 67 in the code disk 24 is for a hold magnet 74 and to allow full movement of the disk 24. The sides of the hole 67 is of magnetic-attractive material. The hold magnet 74 prevents the code disk 24 from moving at random. The larger lower hole 69 is for the key 70 and code disk 24 clearance from the key 70 while the key is at rest.

The (return-to-start) key 70 is made with two blades one of which is made of nonmagnetic-attractive material. The hole 82 in the key 70 is pivoted on the code disk pin 44 by an electromagnet 75 when the electromagnet blade is energized. The nonmagnetic-attractive material blade shoves the code disk 24 back to their (zero) start position. The key 70 carries, not slides, the operated (1 position) cod disks 24 back to the start position. The key 70 slides on the pivot point of the code disks 24 not operated (that remained at zero position). This gives equal pivot pint wear on all the code disks 24. The code disk 24 code holes 46, 47 would represent very few character AREA holes (a choice of four) in the drawings yet in practice there would be many more being smaller holes so very close mechanical tolerances would be necessary. Perhaps multiplier phototubes would be used. Scanning requirements and typefaces would benefit by more AREA holes. Equal code disk pivot point wear is important. The design of the switch is for precision.

An alternate method for the code disk 24 return to start would be to have the magnetic pull side of the code disk hole 69 of magnetic-attractive material while rest of nonmagnetic-attractive material. If this hole 69 enclosed a correctly placed electromagnet with the right clearance around it when energized it would operate the code disks 24. They would be returned to their start (zero) position.

Referring to FIG. 11 The hole 80 is through either case 16, 17. The hole is serves 81 is through either hollow shaft 18, 19. The light bulb 52 pictured in the hole is equal to light bulb 32 being lifted out. Ventilated type of covers for these holes are not shown but in practice used.

This completes the description of my invention which I believe was clear enough to convey a good understanding of the objects and advantages of my invention.

The following claims are submitted to define the nature and scope of the invention.

I claim:

1. Apparatus for receiving XY coded input signals X at a time, which input signals can exist in either of two code states, and in response to the coding of the XY coded input signals moving a selected output rod, said apparatus comprising:

a. X input means, each input means adapted to receive coded input signals;

b. XY code discs, each code disc including in a coded position an opening for the passage OF light therethrough, the XY code discs being divided into X groups, each group including Y code discs;

c. a rotatable housing including a shutter;

d. X code disc selection means mounted on the rotatable housing for rotation therewith adjacent the code discs, each code disc selection means associated with a unique one of the X groups of Y code discs, each of the X code disc selection means uniquely connected to one of the X input means for receipt of coded input signals therefrom;

e. a light source positioned on a first side of the XY code discs and the shutter;

f. light-sensitive detection means positioned on a second side of the XY code discs and he shutter for generation of a detection signal in response to detection of light from the light source after passage through openings in the XY code discs and the shutter;

g. a plurality of output shafts, each output shaft individually mounted for limited longitudinal movement;

h. actuation means responsive to a detection signal from the light-sensitive detection means and to the rotational position of the rotatable housing shutter at the time of generation of that detection signal for actuating a selected one of the plurality of output shafts to move the selected shaft longitudinally;

whereby upon receipt of Y groups of X coded input signals per group, the XY code discs are positioned in accordance with the coding of the XY coded input signals to permit passage of light from the light source through the code disc openings and through the rotatable housing shutter, and, in response to the rotational position of the shutter upon detection of that light, an unique one of the output shafts is moved longitudinally.